United States Patent
Rathod et al.

(10) Patent No.: US 10,618,103 B2
(45) Date of Patent: Apr. 14, 2020

(54) METHOD FOR NON-LINEAR FRACTURE SPLITTING

(71) Applicant: Caterpillar Inc., Peoria, IL (US)

(72) Inventors: Chandrasen R. Rathod, Peoria, IL (US); Chris Richerson, West Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1160 days.

(21) Appl. No.: 14/947,601

(22) Filed: Nov. 20, 2015

(65) Prior Publication Data

US 2017/0144215 A1 May 25, 2017

(51) Int. Cl.
| | |
|---|---|
| *B23K 26/359* | (2014.01) |
| *B21K 23/02* | (2006.01) |
| *B62D 55/21* | (2006.01) |
| *F16C 9/04* | (2006.01) |
| *B26F 3/00* | (2006.01) |
| *B23P 15/00* | (2006.01) |
| *B23D 31/00* | (2006.01) |

(52) U.S. Cl.
CPC ............ *B21K 23/02* (2013.01); *B23K 26/359* (2015.10); *B26F 3/002* (2013.01); *B62D 55/213* (2013.01); *F16C 9/045* (2013.01); *B23D 31/002* (2013.01); *B23P 15/00* (2013.01)

(58) Field of Classification Search
CPC .... B23K 26/359; B23K 26/36; B23K 26/364; B26F 3/00; B26F 3/002; B62D 55/213; F16C 9/04; F16C 9/045; B23D 31/003
See application file for complete search history.

(56) References Cited

U.S. PATENT DOCUMENTS

| | | | | |
|---|---|---|---|---|
| 3,751,080 A | * | 8/1973 | Bailey | B23D 31/003 403/376 |
| 3,818,577 A | * | 6/1974 | Bailey | B23D 31/003 29/413 |
| 3,994,054 A | * | 11/1976 | Cuddon-Fletcher | B23D 31/003 29/888.09 |
| 4,569,109 A | * | 2/1986 | Fetouh | B23D 31/003 29/413 |
| 4,693,139 A | * | 9/1987 | Mukai | B23D 31/003 29/888.09 |
| 4,768,694 A | * | 9/1988 | Fabris | B23D 31/003 225/100 |
| 4,860,419 A | * | 8/1989 | Hekman | B23D 31/003 29/888.09 |
| 4,970,783 A | * | 11/1990 | Olaniran | B23D 31/003 29/413 |
| 5,105,538 A | * | 4/1992 | Hoag | B23D 31/003 29/888.09 |
| 5,208,979 A | * | 5/1993 | Schmidt | B23D 31/003 225/2 |

(Continued)

FOREIGN PATENT DOCUMENTS

| | | |
|---|---|---|
| CN | 102962645 | 3/2013 |
| CN | 104271308 | 1/2015 |

(Continued)

*Primary Examiner* — Daniel J Wiley (74) *Attorney, Agent, or Firm* — Miller, Matthias & Hull (57) ABSTRACT

A method for manufacturing a machine component includes forming a non-linear break notch in a workpiece, freezing the workpiece, and snapping the frozen workpiece apart along the non-linear break notch.

18 Claims, 5 Drawing Sheets

(56) References Cited

U.S. PATENT DOCUMENTS

| | | | | |
|---|---|---|---|---|
| 5,353,500 | A * | 10/1994 | Hoag | B22F 5/003 |
| | | | | 29/888.09 |
| 5,613,182 | A * | 3/1997 | Lynn | B22F 5/003 |
| | | | | 419/28 |
| 5,700,384 | A | 12/1997 | Marchand et al. | |
| 5,775,817 | A | 7/1998 | Gottemoller et al. | |
| 6,125,536 | A * | 10/2000 | Spurny | F16C 9/045 |
| | | | | 29/888.09 |
| 6,357,321 | B1 * | 3/2002 | Schmitt | F16C 7/023 |
| | | | | 29/425 |
| 6,412,267 | B2 | 7/2002 | Duse | |
| 7,299,716 | B2 * | 11/2007 | Nakajima | F16C 7/023 |
| | | | | 384/294 |
| 7,418,886 | B2 * | 9/2008 | Kubota | F16C 7/023 |
| | | | | 74/593 |
| 8,420,972 | B2 | 4/2013 | Cho | |
| 2008/0174175 | A1 | 7/2008 | Livesay | |

FOREIGN PATENT DOCUMENTS

| | | |
|---|---|---|
| DE | 202004007583 | 9/2004 |
| DE | 102004026297 | 9/2005 |
| DE | 102012112539 | 9/2013 |
| EP | 0304162 | 2/1989 |
| KR | 101022835 B1 | 3/2011 |

\* cited by examiner

METHOD FOR NON-LINEAR FRACTURE SPLITTING

FIELD OF THE DISCLOSURE

The present disclosure relates generally to machines and, more particularly, to manufacturing mating machine components.

BACKGROUND OF THE DISCLOSURE

Construction and earth-moving machines are often propelled by continuous tracks. Such machines may be used to move materials such as soil, rock, gravel, sand, asphalt, and the like during the construction or maintenance of paved surfaces, building sites, landscapes, mines, or other areas. For example, track type tractors and excavators propelled by continuous track may be used to excavate earth, transport earth and/or building materials, smooth and grade surfaces, and demolish old structures. Typically, such machines include a chassis which supports an engine and an operator cab. An undercarriage supports the chassis and includes a pair of continuous track drives. A continuous track drive may include a continuous track supported by undercarriage track rollers and a toothed drive wheel. A continuous track may include links, pins and bushings connecting the links, and a master link. A master link may have a pin section and a bushing section that may be bolted together. Bolting the pin and bushing sections together may make a loop of the pin-connected links that may circumscribe and mate with the toothed drive wheel and undercarriage track rollers, thus forming the continuous track.

During a work cycle, the master link may be subjected to large tension forces and the master link bolts may correspondingly be subjected to large shear forces. Also during a work cycle, the pin and bushing sections of the master link may move relative to each other. For instance, when moving a large load with a track type tractor, the master link must accept a tension force exerted by the toothed drive wheel large enough to displace the machine and the load while the pin and bushing sections flex over uneven terrain. Relative movement combined with such large tension forces may eventually fatigue and subsequently destroy the master link. This situation may result in a work stoppage, further damage to the machine, or otherwise disrupt the worksite. Otherwise, master links may be monitored and preventively removed from the machine before they become fatigued, sometimes resulting in a work stoppage when performing the preventive maintenance. A broken master link may also strand the machine, thus requiring another machine to move the disabled machine to a repair site.

Master links with some relative movement limiting features are available. Such master links are often arranged with a plurality of mating teeth. More specifically, the pin and bushing sections are each equipped with precisely machined mating teeth to increase the engagement surface area between the pin and bushing sections. However, these efforts to provide more engagement surface area between the pin and bushing sections by precisely machining the mating teeth have been found largely lacking. It has been generally found that despite having multiple precision-machined teeth, only thin portions of each tooth engage with a corresponding tooth. In U.S. Pat. No. 8,420,972, Cho shows one example of an existing strategy for attempting to increase engagement surface area.

It can therefore be seen that improvements in the arrangement and manufacture of the master link and associated structures are desired.

SUMMARY OF THE DISCLOSURE

In accordance with one embodiment, a method for manufacturing a machine component is disclosed. The method may include forming a non-linear break notch in a workpiece. The method may further include freezing the workpiece. The method may even further include snapping the frozen workpiece apart along the non-linear break notch.

In accordance with another embodiment, a machine component is disclosed. The machine component may be manufactured by a method that may include forging a workpiece. The method may further include forming a non-linear break notch in the workpiece. The method may even further include freezing the workpiece. The method may yet further include snapping the workpiece apart along the non-linear break notch.

In accordance with yet another embodiment, a machine component is disclosed. The machine component may include first and second members, a non-linear fractured joint abutment, and a bolt. The first member may have a first non-planar intimate mating face and a first multitude of facets. The first multitude of facets may be disposed on the first non-planar intimate mating face. The second member may have a second non-planar intimate mating face and a second multitude of facets. The second multitude of facets may be disposed on the second non-planar intimate mating face and may intimately mate with the first multitude of facets. The non-linear fractured joint may be formed between the first and second intimate mating faces. The bolt may join the first and second members and may traverse the non-linear fractured joint.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
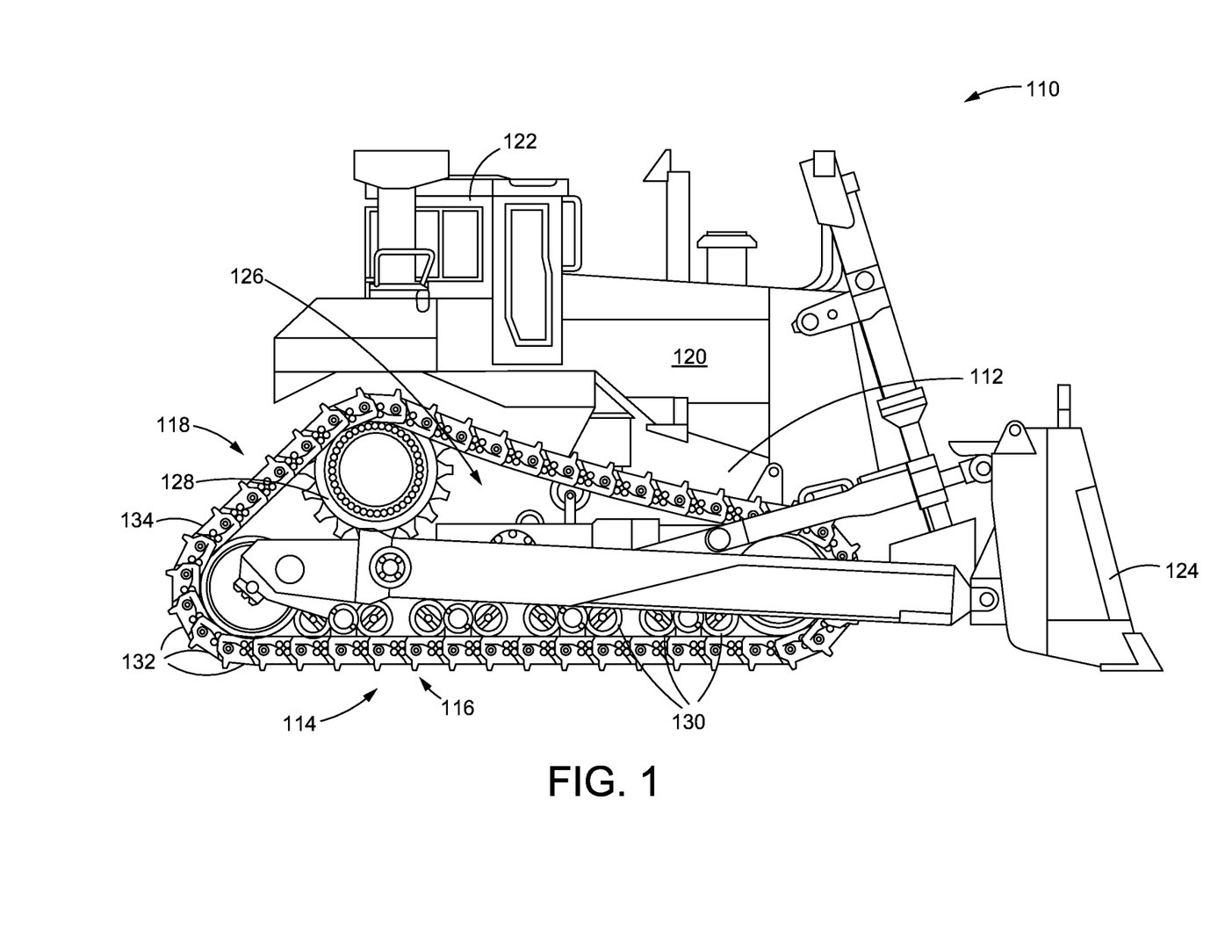
FIG. 1 is a side view of a machine, in accordance with an embodiment of the present disclosure.

Referring now to the drawings and with specific reference to FIG. 1, a machine consistent with certain embodiments of the present disclosure is generally referred to by reference numeral 110. It is to be understood that although the machine is depicted in FIG. 1 as a track type tractor, the teaching of the present disclosure can be employed with equal efficacy in connection with many other types of machines used in construction and earth moving applications including, but not limited to, excavators, bulldozers, graders, pipelayers, and the like.

The machine 110 may include a chassis 112 supported by continuous tracks 114. Typically, first and second tracks 116, 118 laterally flank the chassis 112 but other numbers of tracks are possible. The chassis 112 may support an engine 120, an operator cab 122, and a work implement 124. In the depicted embodiment, a bulldozer blade and support arms are provided as implement 124, but it is to be understood that other implements such as, but not limited to, augers, fork lifts, excavators, and the like are possible. The chassis 112 is itself supported by an undercarriage 126. The undercarriage 126 may include at least one drive wheel 128 and at least one undercarriage track roller 130 which are circumscribed by the continuous track 114. The drive wheel 128 may be drivably connected to the continuous track 114 so as to provide propulsion thereto. The undercarriage track rollers 130 may serve to support and guide the continuous track 114 in a continuous loop. The continuous track 114 may include links 132 and a master link 134. The mating structures of the master link 134 are described more fully in conjunction with FIGS. 2-3 below.

Figure 2:
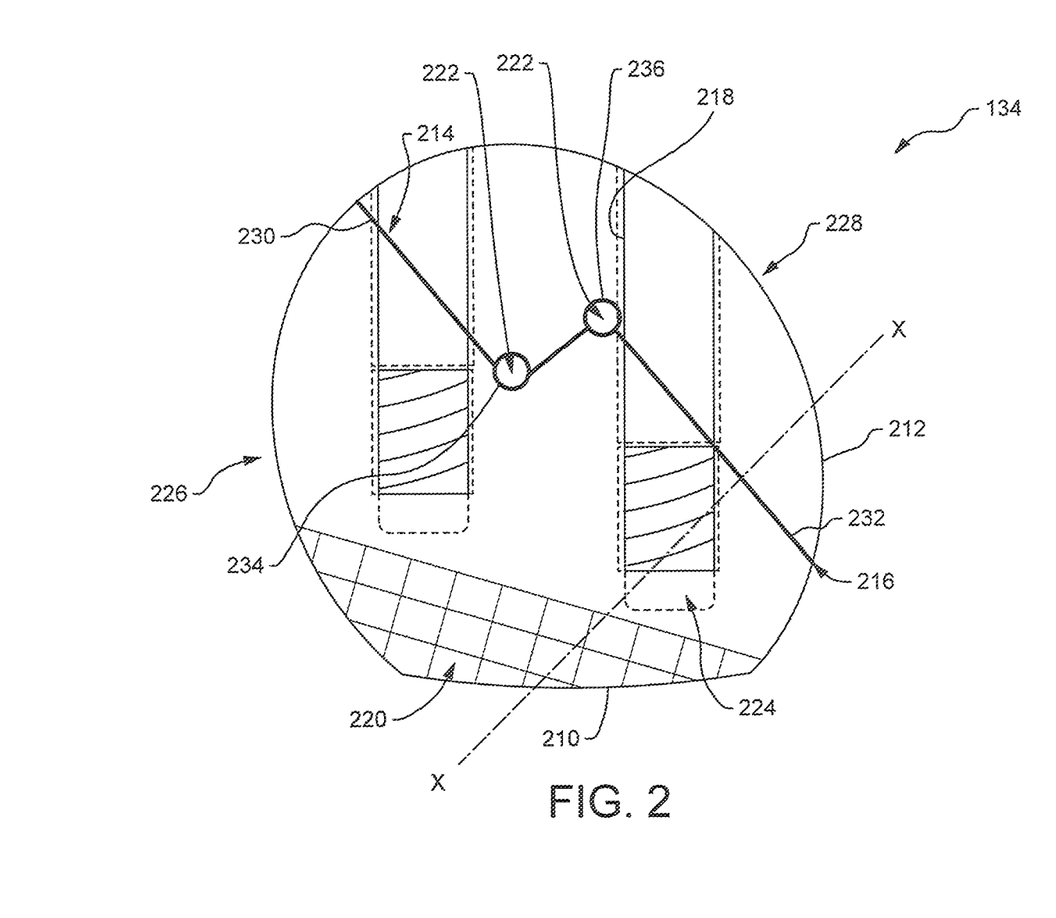
FIG. 2 is a side view of a master link of the machine, in accordance with an embodiment of the present disclosure.
Figure 3:
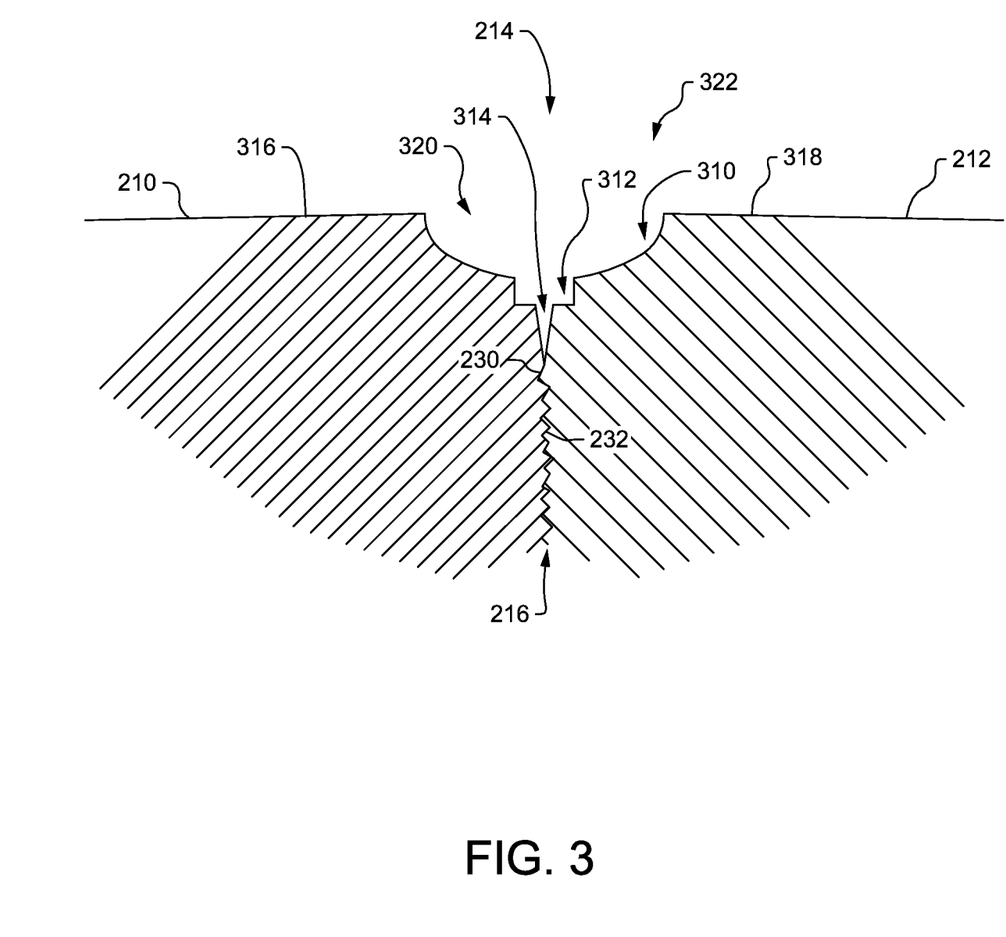
FIG. 3 is an enlarged cross-sectional view of the master link along line X-X of FIG. 2, in accordance with an embodiment of the present disclosure.
Figure 4:
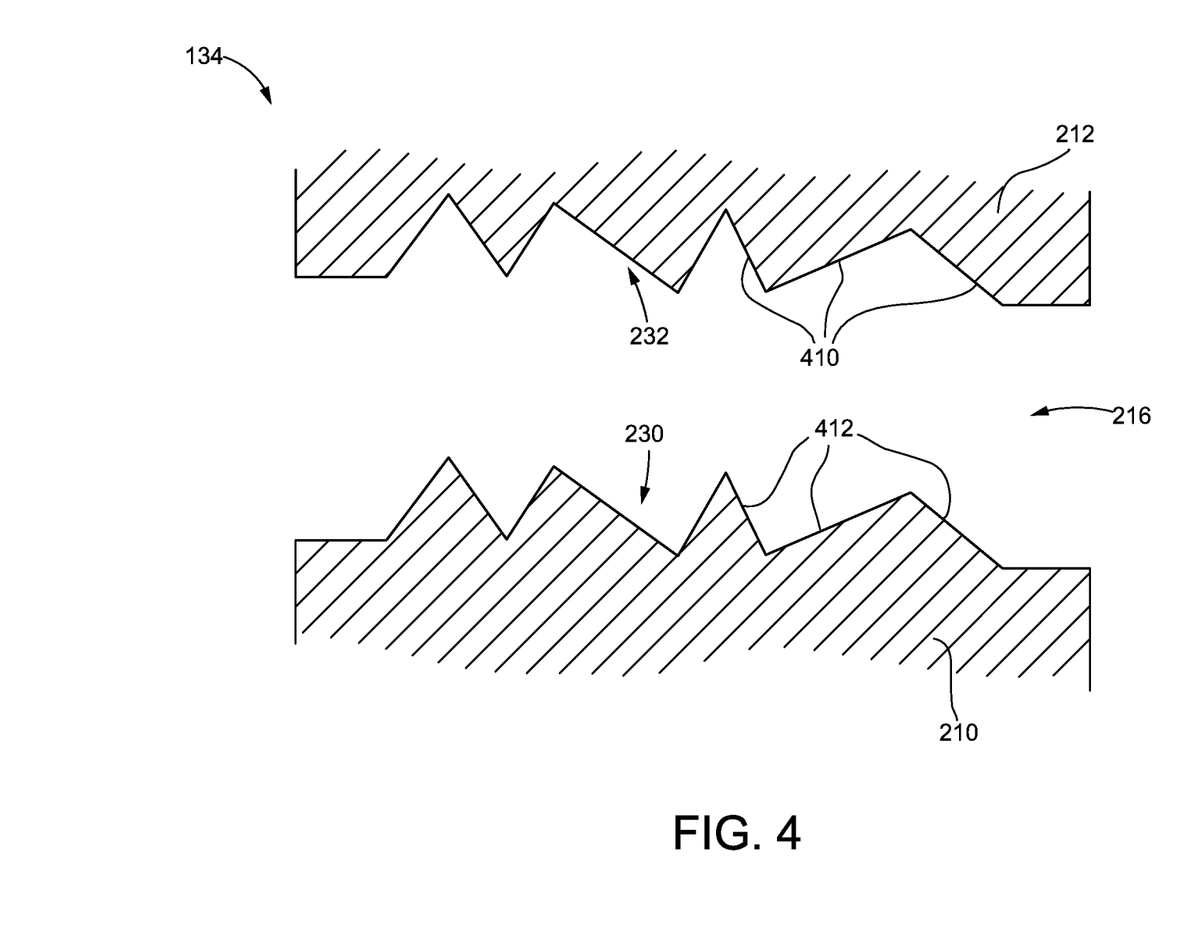
FIG. 4 is an exploded and enlarged cross-sectional view of the master link along line X-X of FIG. 2, in accordance with an embodiment of the present disclosure.

Looking at FIG. 2, the master link 134 may have first and second members 210, 212, a non-linear break notch 214, a fractured joint 216, at least one bolt 218, gripping features 220, break guide holes 222, and at least one bolt hole 224. Integral first and second portions 226, 228 of the master link 134 may each extend from the non-linear break notch 214. Further, the integral first and second portions 226, 228 may be separated from each other by a split fracturing method to form the first and second members 210, 212, which will be described in conjunction with FIG. 5. It should be understood and appreciated that the master link 134 is but one singular example of a machine component that may be produced by the split fracturing method of FIG. 5, which may be applied to other machine components, such as, but not limited to jointed plates, housings, covers, beams, and the like. The bolt hole 224 may be collinearly disposed in the first and second members 210, 212 which may be secured together by threadably engaging the bolt 218 in the bolt hole 224. Put another way, the bolt hole 224 may intersect the non-linear break notch 214 and the bolt 218 may traverse the fractured joint 216 to join the first and second members 210, 212. Additionally, the first and second members 210, 212 may respectively have first and second non-planar intimate mating faces 230, 232 which may interlock at the fractured joint 216. FIGS. 3-4 explained below will shed additional light on the first and second non-planar intimate mating faces 230, 232. Furthermore, the first and second members 210, 212 together may carry the non-linear break notch 214.

More specifically, in one embodiment, the non-linear break notch 214 may be an undulating zigzag "Z" shape and may have first and second apexes 234, 236. In another embodiment, the non-linear break notch 214 may be an undulating curved "S" shape which may also have first and second apexes 234, 236. In some embodiments, the break guide holes 222 may be located at first and second apexes 234, 236. It should be understood that the non-linear break notch 214 and the break guide holes 222 may work to guide the fracturing of the integral first and second portions 226, 228 into the first and second members 210, 212 during the split fracturing method of FIG. 5 described below. It should also be understood that the non-linear path of the non-linear break notch 214 may form the interlocking non-planar profiles of the first and second non-planar intimate mating faces 230, 232 during the split fracturing method of FIG. 5. Further, the gripping features 220 may be disposed on the master link 134 and may aid the non-linear break notch 214 and break guide holes 222 in cleanly breaking the integral first and second portions 226, 228 during the split fracturing method of FIG. 5. Textures such as, but not limited to, knurling, dimpling, striations, and the like may be used as gripping features 220. Further features of the non-linear break notch 214 are illustrated by FIG. 3 and described below.

Turning to FIG. 3, the non-linear break notch 214 may include a valley 310, a channel 312, and a groove 314. Additionally, the first and second members 210, 212 may respectively further include first and second top surfaces 316, 318. A first slope 320 of the non-linear break notch 214 may be carried by the first member 210 and a second slope 322 of the non-linear break notch 214 may be carried by the second member 212. The valley 310 may be disposed in the first and second top surfaces 316, 318. The channel 312 may be disposed in the valley 310 below the first and second top surfaces 316, 318 and may be thinner in cross section than the valley 310. The groove 314 may be disposed in the channel 312 and may be thinner in cross section than the channel 312. It should be understood that the valley 310, channel 312, and groove 314 may have additional cross-sectional profiles than those depicted in FIG. 3, including, but not limited to, square, rounded, ovular, semi-circular, triangular, polygonal, and the like. The first and second non-planar intimate mating faces 230, 232 may be jagged and, as above, may meet at the fractured joint 216, which may terminate at the groove 314. Further features of the mating between the first and second members 210, 212 at the fractured joint 216 via the first and second non-planar intimate mating faces 230, 232 are more fully described in FIG. 4 below.

Focusing now on FIG. 4, the first and second non-planar intimate mating faces 230, 232 may respectively have first and second multitudes of facets 410, 412 which may serve to increase the engagement surface area between the first and second non-planar intimate mating faces 230, 232. In some embodiments, the first and second multitudes of facets 410, 412 may be metallic crystal facets. It should be understood that the first and second multitudes of facets 410, 412 may be produced via the split fracturing method of FIG. 5, clarified below. More specifically, as the first and second non-planar intimate mating faces 230, 232 are brought together to form the fractured joint 216 (shown in exploded FIG. 4 as separated), the first and second multitudes of facets 410, 412 may microscopically interlock together, thus intimately mating the first and second members 210, 212 along the first and second non-planar intimate mating faces 230, 232. This microscopic interlocking of the first and second multitudes of facets 410, 412 combined with the macroscopic interlocking of the non-planar intimate mating faces 230, 232 described above may lend great shear strength to the fractured joint 216.

INDUSTRIAL APPLICABILITY

In operation, the foregoing disclosure finds utility in various industrial applications, such as, but not limited to, construction, road building, agriculture, mining, demolition, excavation, and transportation. In particular, the disclosed master link and may be applied to construction equipment and any other machine equipped with continuous tracks. Further, the split fracturing method described below in conjunction with FIG. 5 may be applied to any machine component with at least two members bolted together. By using the disclosed machine and the associated master link manufactured by the split fracturing method described below, fatigue failure of the master link members due to their relative movement may be prevented. Furthermore, producing intimately mating members by using the split fracturing method described below may prevent relative movement fatigue failure in other types of machine components besides the disclosed exemplary master link, such as, but not limited to, plates, covers, housings, containers, and the like. Moreover, preventing machine component fatigue failure may reduce work time lost to repairs, thus increasing worksite efficiency. Even more, fatigue failure-resistant machine components may prevent damage to the machine and other worksite disruptions. The disclosed machine and method may thus provide safety and cost saving measures.

Figure 5:
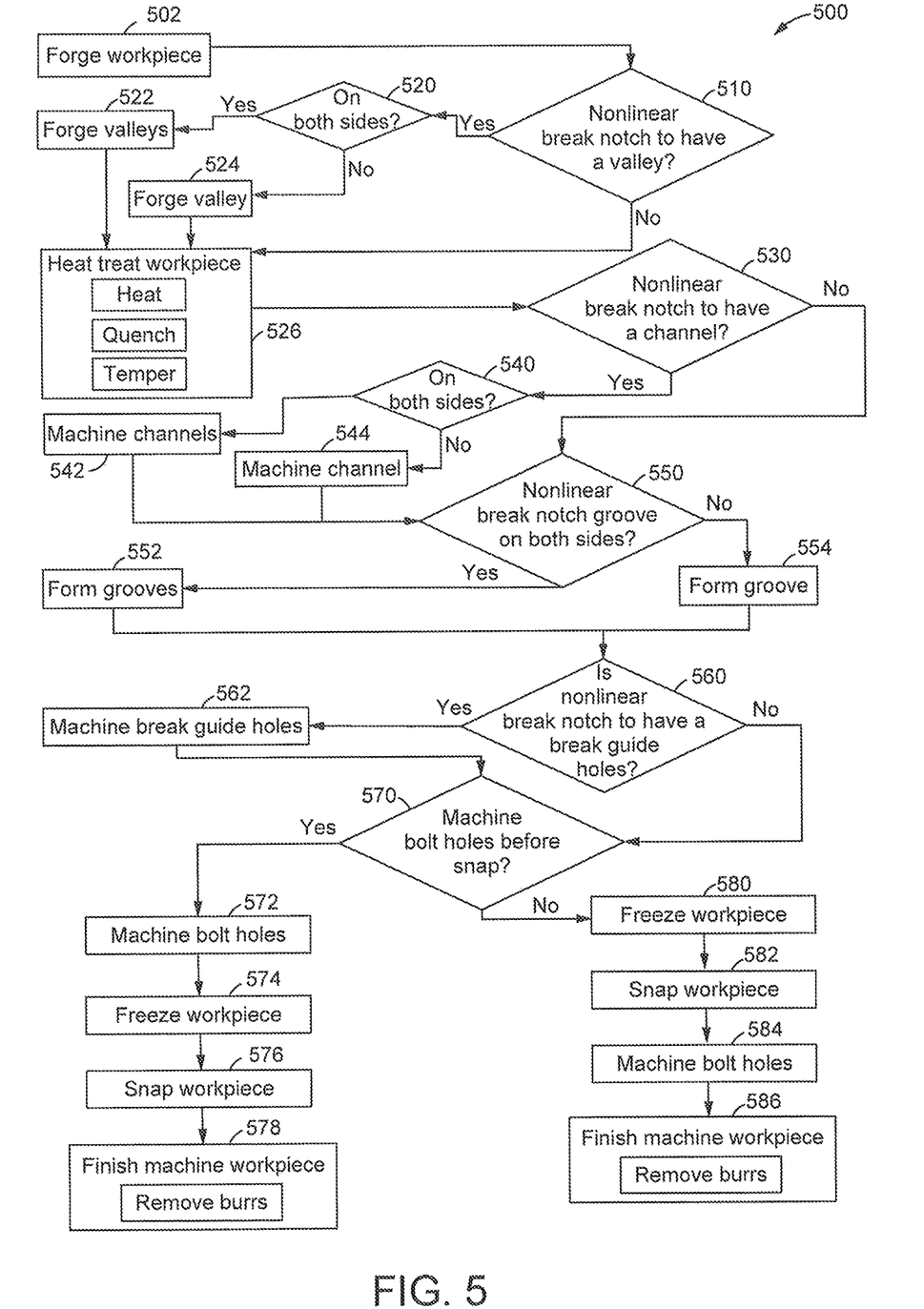
FIG. 5 is a flow chart depicting a sample method to manufacture a machine component, in accordance with an embodiment of the present disclosure.

FIG. 5 is a flow diagram showing an exemplary method 500 of manufacturing a machine component with a fractured bolted joint via a non-linear break notch. More specifically, at stage 502, a workpiece with opposite sides may be forged. Before further explanation, it should be understood that fracture entry and exit non-linear break notches may be formed in the workpiece, i.e., a non-linear break notch on both opposite sides of the workpiece. Following stage 502, a decision may be made at stage 510 as to whether any of the non-linear break notches to be formed are to have a valley. If so, another decision may be made at a stage 520 as to whether both sides of the workpiece are to have a valley. If a valley is to be formed on both sides, the valleys may be forged into the workpiece at a stage 522. If a valley is to be formed on one side, the valley may be forged into the workpiece at a stage 524. It should be understood that any valley may be the same non-linear shape as the desired non-linear break notch. Following the valley forging of stages 522, 524, the method 500 may move on to a stage 526. If the workpiece is not to have a valley, the method 500 may progress from the decision of stage 520 directly to the stage 526.

At stage 526, the workpiece may be heat treated which may include heating, quenching, and tempering the workpiece. Following this, another decision may be made at a stage 530 as to whether the non-linear break joint is to have a channel. If so, another decision may be made at a stage 540 as to whether both sides of the workpiece are to have a channel. If a channel is to be formed on both sides, the channels may be machined into the workpiece at a stage 542. If a channel is to be formed on one side, the channel may be machined into the workpiece at a stage 544. It should be understood that any channel may be the same non-linear shape as the desired non-linear break notch. It should be further understood that the channel may be machined in the valley, if any valley were forged in stages 522, 524. After the channel machining of stages 542, 544, the method 500 may progress to a stage 550. If a channel is not desired, the method 500 may move from the decision stage 530 directly to the stage 550.

At stage 550, a decision may be made as to whether both sides of the workpiece are to have a non-linear break notch groove, that is to say at least one groove is to be formed in the workpiece. If a groove is desired on both sides, the grooves may be formed into the workpiece at a stage 552. If a groove is desired on one side, the groove may be formed into the workpiece at a stage 554. It should be understood that any groove may be formed in any valley and in any channel that were formed in stages 522, 524, 542, 544, respectively. It should also be understood that any groove may be the same non-linear shape as the desired non-linear break notch. In some embodiments, the groove may be formed by machining. In other embodiments, the groove may be formed by a water jet. In further embodiments, the groove may be formed by a laser. It should be understood that the laser may be any type of industrial laser such as, but not limited to, carbon dioxide ($CO_2$), neodymium (Nd), neodymium doped-yttrium-aluminum-garnet (Nd:YAG), and the like. It should also be understood that the laser may be used in any material-removal manner, including, but not limited to etching, drilling, and the like. After the groove formation of stages 552, 554, the method 500 may continue on to a stage 560.

At stage 560, a decision may be made as to whether the non-linear break notch is to have guide holes. If yes, break guide holes may be machined into the workpiece at a stage 562. If no, the method 500 may progress to a stage 570.

At stage 570, a decision may be made as to whether bolt holes should be machined into the workpiece before snapping, which will be described below. If this is the case, bolt holes may be machined into the workpiece at a stage 572. Following this, the workpiece may be frozen at a stage 574. In some embodiments, freezing the workpiece may be cryogenic freezing and may be accomplished by immersing the workpiece in an extremely cold liquid, such as, but not limited to liquid nitrogen. It should be understood that freezing the workpiece may make the workpiece brittle and may aid in snapping the workpiece, explained below.

Next, at a stage 576, the frozen workpiece may be snapped into two separate members along the non-linear break notch by holding a first portion of the workpiece extending from the non-linear break notch stationary and forcefully and rapidly striking a second portion of the workpiece extending oppositely from the non-linear break notch. In some embodiments, gripping features disposed on the workpiece may aid in holding the first portion stationary. In other embodiments, a hammer may be used to accomplish the forceful and rapid striking of the second portion. It should be understood that the hammer may be a power hammer and may be powered by any power source, including, but not limited to, compressed air, an electric motor, an engine, and the like. Finally, after the snapping of the stage 576, the two members may be finish machined at a stage 578, which may include burr removal.

Returning now to stage 570, if bolt holes are not to be machined before snapping, the method 500 may advance to a stage 580 in which the workpiece is frozen in the same manner as in stage 574 described earlier. Then, the workpiece may be snapped at a stage 582 in the same way as in stage 576 explained above. After the snapping of stage 582, at least one collinear bolt hole may be machined into the two members at a stage 584. Finally, the two members may be finish machined at stage 586, which may include burr removal.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A method for manufacturing a machine component, comprising:
    forming a non-linear break notch in a workpiece, the non-linear break notch including a valley, a channel, and a groove;
    freezing the workpiece; and
    snapping the frozen workpiece apart along the non-linear break notch.

2. The method of claim 1, further comprising:
    machining bolt holes in the workpiece, the bolt holes intersecting the non-linear break notch.

3. The method of claim 2, wherein machining the bolt holes in the workpiece is performed before snapping the frozen workpiece.

4. The method of claim 2, wherein machining the bolt holes in the workpiece is performed after snapping the frozen workpiece.

5. The method of claim 1, further comprising:
    heat treating the workpiece.

6. The method of claim 5, wherein heat treating the workpiece includes heating the workpiece, quenching the workpiece, and tempering the workpiece.

7. The method of claim 1, wherein forming the non-linear break notch includes forging the workpiece to form the valley.

8. The method of claim 1, wherein forming the non-linear break notch includes machining the workpiece to form the channel.

9. The method of claim 1, wherein forming the non-linear break notch includes machining the workpiece to form the groove.

10. The method of claim 9, wherein machining the workpiece to form the groove is performed with a laser.

11. The method of claim 1, wherein the non-linear break notch includes at least one apex and further comprising:
    machining a break guide hole into the workpiece at each at least one apex.

12. The method of claim 1, further comprising:
    finish machining the workpiece.

13. The method of claim 1, wherein freezing the workpiece is cryogenic freezing.

14. A machine component manufactured by the method of comprising:
    forging a workpiece;
    forming a non-linear break notch in the workpiece, the non-linear break notch including a valley, a channel, and a groove;
    freezing the workpiece; and
    snapping the workpiece apart along the non-linear break notch.

15. The machine component of claim 14, wherein the method of manufacture further includes:
    machining bolt holes in the workpiece before snapping the workpiece, the bolt holes intersecting the non-linear break notch.

16. The machine component of claim 14, wherein the method of manufacture further includes:
    machining bolt holes in the workpiece after snapping the workpiece, the bolt holes intersecting the non-linear break notch.

17. The machine component of claim 14, wherein forming the non-linear break notch includes:
    the valley being formed by forging;
    the channel being formed by machining; and
    the groove being formed by machining.

18. The machine component of claim 14, wherein freezing the workpiece is cryogenic freezing.

* * * * *